June 18, 1929.  H. A. F. CAMPBELL  1,718,110
LOCOMOTIVE CRANK PIN
Filed March 12, 1929
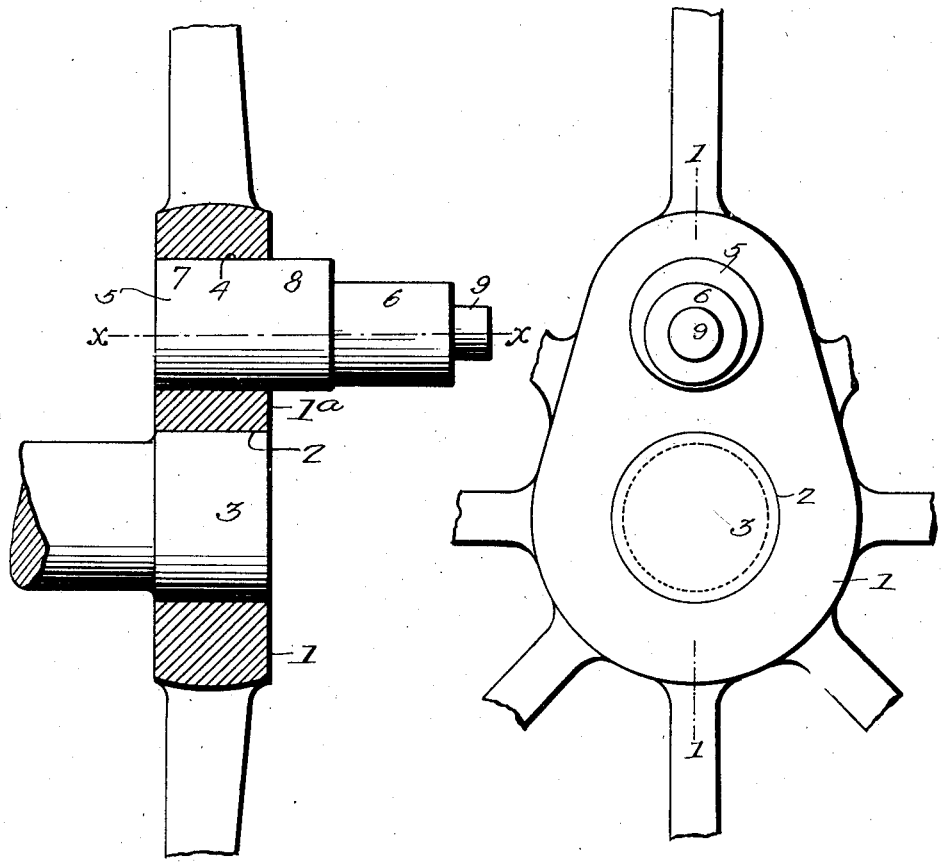
Inventor:-
Harry A. F. Campbell,
by his Attorneys.

Patented June 18, 1929.

1,718,110

UNITED STATES PATENT OFFICE.

HARRY A. F. CAMPBELL, OF PHILADELPHIA, PENNSYLVANIA.

LOCOMOTIVE CRANK PIN.

Application filed March 12, 1929. Serial No. 346,336.

My invention relates to certain improvements in the main crank pin which is mounted on one of the driving wheels of a locomotive.

The object of my invention is to increase the amount of metal in the wheel centre between the axle opening and the crank pin opening, without increasing the stroke of the cylinders. This object I attain in the following manner, reference being had to the accompanying drawing, in which:

Fig. 1 is a sectional view on the line 1—1, Fig. 2, showing the wheel centre, axle, and the improved crank pin; and Fig. 2 is a face view of the wheel centre with the crank in position.

The centre 1 of the locomotive driving wheel has a central opening 2 for the axle 3 and an opening 4 for the crank pin 5.

The crank pin is a double crank pin having a portion 6 on which the driving rod is attached and a portion 8 for the side rod. The driving rod is connected to the crosshead in any ordinary manner.

The portion 6 of the crank pin is substantially the same distance from the centre of the wheel as heretofore. The body portion 7 of the pin, as well as the portion 8, is eccentric to a line x—x drawn through the portion 6 of the pin. This construction provides sufficient metal at 1ª between the pin and the axle without increasing the piston stroke of the locomotive, and the body of the pin can be made much larger owing to its eccentricity.

In this instance the stroke of the side rods of the locomotive is different from the stroke of the piston.

The stroke of the piston should not be excessively long, as it results in a too high piston speed for the best steam economies.

On the end of the portion 6 of the pin, in the present instance, is a smaller pin 9 for the eccentric crank.

I claim:—

1. A double crank pin for a locomotive, having a body portion arranged to be mounted in a wheel, a concentric portion for the side rod crank, and an eccentric portion for the driving rod of the locomotive.

2. The combination of a wheel having a central axle opening and a crank pin opening some distance from the central opening; a crank pin mounted in the crank pin opening and having a concentric projecting portion forming the pin for a side rod; and an eccentric portion at the side nearest the central opening of the wheel for the driving rod.

3. The combination of a wheel having a central axle opening and a crank pin opening some distance from the central opening; a crank pin mounted in the crank pin opening and having a concentric projecting portion forming the pin for a side rod; an eccentric portion at the side nearest the central opening of the wheel for the driving rod; and a further projection on the end of the driving rod pin for an eccentric crank.

HARRY A. F. CAMPBELL.